United States Patent
Looney

(10) Patent No.: US 6,260,308 B1
(45) Date of Patent: Jul. 17, 2001

(54) COVERING MECHANISM FOR A GREENHOUSE

(75) Inventor: Donald F Looney, Irmo, SC (US)

(73) Assignee: Jaderloon Company INC, Irmo, SC (US)

( * ) Notice: Subject to any disclaimer, the term of this patent is extended or adjusted under 35 U.S.C. 154(b) by 0 days.

(21) Appl. No.: 09/189,268

(22) Filed: Nov. 10, 1998

Related U.S. Application Data

(63) Continuation of application No. PCT/US97/16532, filed on Sep. 18, 1997.
(60) Provisional application No. 60/027,058, filed on Sep. 30, 1996.

(51) Int. Cl.$^7$ ........................................ E04B 7/16
(52) U.S. Cl. ........................................ 52/63; 52/66
(58) Field of Search ........................ 52/63, 64, 66, 52/83, 222; 47/17, 26

(56) References Cited

U.S. PATENT DOCUMENTS

| | | | |
|---|---|---|---|
| 3,009,166 | * 11/1961 | Sears | 52/66 |
| 3,510,996 | * 5/1970 | Popil | 52/64 |
| 4,067,347 | 1/1978 | Lipinski . | |
| 4,348,833 | 9/1982 | Nagoya . | |
| 4,387,533 | 6/1983 | Green et al. . | |
| 5,038,517 | 8/1991 | Talbott . | |
| 5,212,903 | 5/1993 | Talbott . | |
| 5,564,234 | * 10/1996 | Vermeulen | 52/63 |
| 5,655,335 | 8/1997 | Vermeer . | |

\* cited by examiner

Primary Examiner—Michael Safavi
(74) Attorney, Agent, or Firm—Michael A. Mann; Nexsen Pruet Jacobs & Pollard

(57) ABSTRACT

Mechanism for covering a greenhouse has rotating shaft upon which a flexible cover is wound. The shaft travels along an arch or bow truss with the cover being wound upon or released from the shaft to uncover or cover the greenhouse. Two rotating shafts are provided on opposite sides of the roof ridge and each are attached to two sets of cables. One set of cables serving to pull the covers and a second set serving to apply tension to the covers during the covering and uncovering process. A counter weight or spring anchored to the floor is used with the second set of cables to assure adequate tension is applied to the covers.

20 Claims, 2 Drawing Sheets

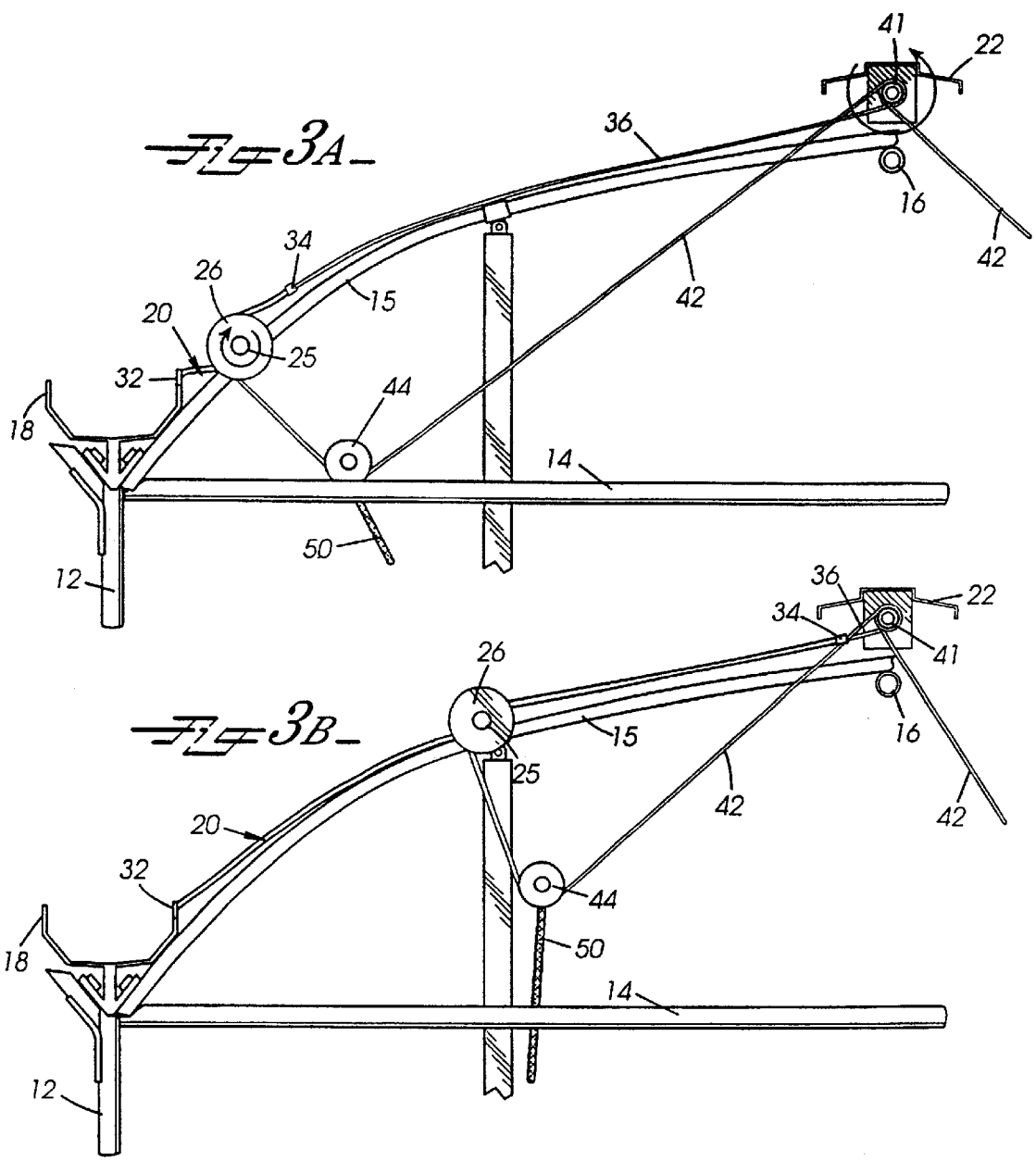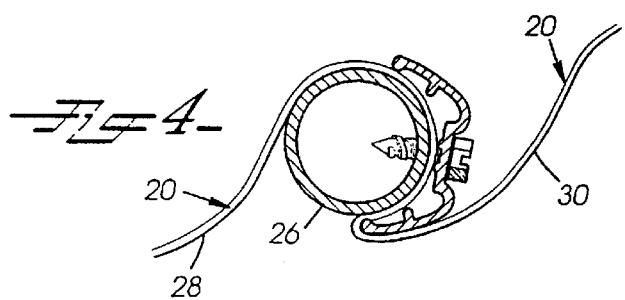

COVERING MECHANISM FOR A GREENHOUSE

This application is a continuation of PCT application PCT/US97/16532 filed Sep. 18, 1997 which PCT application claims benefit to U.S. provisional application 60/027,058 filed Sep. 30, 1996.

BACKGROUND OF THE INVENTION

1. Field of the Invention

The present invention relates generally to greenhouses. More specifically, the present invention relates to devices that allow the user to cover and uncover the top of a greenhouse at will.

2. Discussion of Background

A greenhouse is a lightweight enclosure that provides covering for plants and seedlings, whether planted in flowerpots or trays or in the earth enclosed by the greenhouse. Typically, a greenhouse comprises a framework and a covering. The framework can be made of metal, wood or plastic; and the covering can be made of glass, flexible plastic sheeting or panels. Invariably, the covering is light-transmitting although not necessarily light-transparent and is most often "fixed"; that is, it remains permanently in place and is not easily openable or removable. For ventilation, greenhouse will often have louvers, perhaps, with assisted by large fans, on the ends.

The purpose of the greenhouse is to protect the plants and seedlings from the extremes of the environment: excessive heat or cold, excessive amounts of rain or "hard" rains. However, greenhouses can also cause problems for growing plants. They trap heat, for example. Also, because plants naturally grow toward the light—a tendency known as phototropism —and because greenhouse coverings invariably attenuate the light, plants in greenhouses can tend to be spindly.

Ideally, greenhouses should have a cover that can be opened when the weather is clear and warm, and that can be closed on nights when the temperature is expected to drop to unacceptably low levels, or on days when it will rain excessively or rain hard, or when too much heat has built up in the greenhouse. Such a cover would not only help to regulate the temperature within the greenhouse, but would reduce watering costs and make plants healthier, thicker and fuller.

There are greenhouses that can be opened up or uncovered. Theoretically, greenhouses can have windows similar to those in homes. However, it is simply not practical to incorporate ordinary windows into greenhouse designs. First, a system for uncovering a greenhouse must be simple structurally so that it is not cost-prohibitive. It must be easy to use so that greenhouses can be uncovered and covered quickly and without special training. Furthermore, commercial greenhouses often cover several acres of ground. If the closure mechanism is too complicated or slow, operating it may require extensive manpower or time or both. Finally, if the covering for the greenhouse is made of plastic, the covering mechanism must accommodate the characteristics of plastic. These characteristics include (1) a tendency to "bathtub" or collect water where the plastic sags, (2) the tendency to catch the wind and (3) limited structural strength.

However, the advantages of a system that can meet this requirement are considerable. An inexpensive, easy to use and reliable system for covering and uncovering the greenhouse can make growing of plants much easier and result in higher quality plants, better yields and lower costs. Moreover, such a system is not limited to use as greenhouses. Temporary structures for out-of-door events can also benefit from such a mechanism.

There remains a need for a covering mechanism for greenhouses that operates easily and simply and does not add undue cost to the overall cost of greenhouse construction.

SUMMARY OF THE INVENTION

According to its major aspects and briefly stated, the present invention is a mechanism for covering a greenhouse. The mechanism allows the user to pull a cover over the top of the greenhouse frame and to retract the cover from the top of the greenhouse frame while keeping tension on the covering material so that the problems of the prior art mechanisms are avoided. Putting its operation simply, in the present covering mechanism, a rotating central shaft unrolls two flexible covers from driving shafts onto the top of the greenhouse, pulling them up to the top center of the greenhouse from its sides. Each cover is pulled using two sets of cables, one set pulling the covers and the other set operating in an opposing direction to apply tension to the covers during the covering and uncovering process. A counter weight or spring achored to the floor is used with the second set of cables to assure that adequate tension is applied regardless of the direction the cover is moving. The cables of the first set wind around the central shaft. The cables of the second set wind around a driving shaft mounted to the end of the central shaft so as to be coaxial with it. The first set of cables pulls the cover toward the top center of the greenhouse when winding around the central shaft. The cables of the second set wind around the driving shaft and the tension drums. When the cables of the first set is being wound up, the cables of the second set are unwinding from the driving shafts and winding onto the tension drums. The springs are applied to the second of set cables to tension them, counter to that applied by the first set of cables.

More specifically, two sheets of flexible covering material are wrapped about a tension shaft simultaneously, one tension shaft for each side of the top of the greenhouse, so that, when the tension shafts are fully wound, the inner and outer edges of the sheets are adjacent to each other and the outer edges are the "leading" edges, that is, they are the first parts of the covering material to be freed from the tension shaft when it is unrolled. The inner edges of the two sheets are firmly attached to the tension shaft.

A first leading edge is also firmly attached by a first clip to the side of the greenhouse and a second leading edge is attached to a second clip. The second clip is not attached to the frame; rather it is connected by the first set of cables to the central shaft at the top center of the greenhouse framing. As the central shaft turns, these cables pull the second clip and second leading edge of each panel toward the top center of the greenhouse, unrolling the covering material from the tension shafts as the tension shafts themselves roll up from the sides to the top of the greenhouse. By the time the second leading edge of each panel reaches the top center of the greenhouse, each tension shaft has reached a position approximately halfway between the top center and the sides of the greenhouse. Tension on the covering material is applied and maintained by the second set of cables and the counter weights. As the second set of cables is unwound from the driving shaft, it is wound onto the tension drums. The springs automatically take up the slack in the second cable set. When the greenhouse is to be uncovered, the process is simply reversed.

Keeping the covering under tension using opposing sets of cables and the counter weights is a very important feature of the present invention. By maintaining tension, not only is sagging of the covering avoided with the attendant problems of rainwater collection, but also the cover winds onto and unwinds from the tension shafts more smoothly and uniformly so that the covering does not bunch or catch.

Having two panels that move from the sides to the top center to cover the greenhouse is another important feature of the present invention. The easiest way to vent the greenhouse is through the top center, that being the highest point. Partially uncovering the greenhouse may be sufficient to ventilate it, a feature that may be important, for example, during a long rain on a warm day when the need for ventilation competes with the need for protection from the excessive rain, or when ventilation is needed, but the outside temperature is much lower than the inside temperature.

Using one central shaft to operate two symmetric panels is another feature of the present invention, especially since the driving shaft turns with the central shaft. This feature simplifies the control requirements and power requirements for the present invention. Essentially one motor rotates both shafts at the same time; therefore, one motor (or hand crank) is needed to operate the present system.

Other features and their advantages will be apparent to those skilled in the art of greenhouse design from a careful reading of the Detailed Description of Preferred Embodiments accompanied by the following drawings.

BRIEF DESCRIPTION OF THE DRAWINGS

In the drawings,

FIGS. 3A and 3B are end views of the left side of the covering mechanism in a mostly uncovered position (FIG. 3A) and a covered position (FIG. 3B) according to a preferred embodiment of the present invention; and FIG. 4 is a cross sectional view of the covering material wrapping onto a tension shaft of the present covering mechanism according to a preferred embodiment of the invention.

DETAILED DESCRIPTION OF PREFERRED EMBODIMENTS

Figure 1:
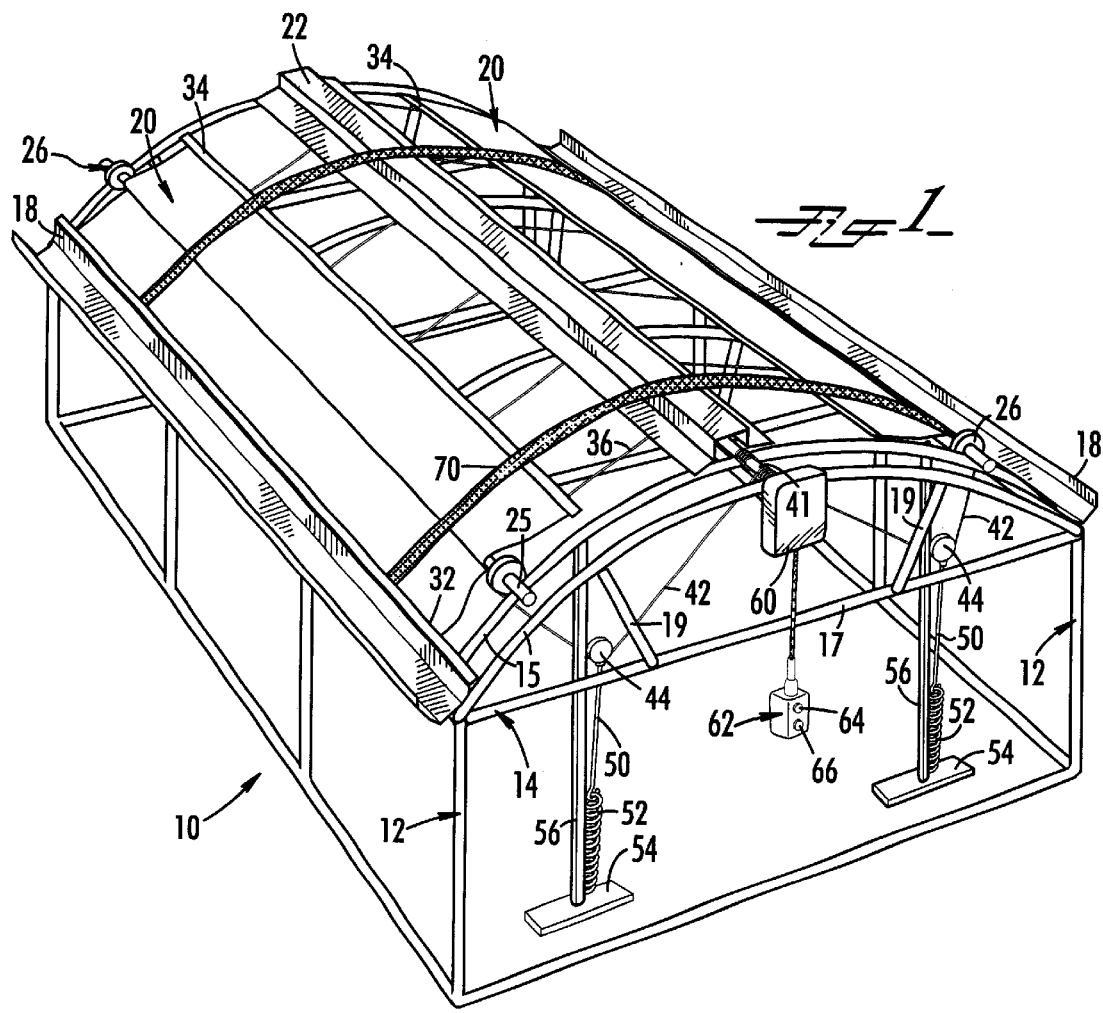
FIG. 1 is a perspective view of a greenhouse with a covering mechanism according to a preferred embodiment of the present invention.
Figure 2:
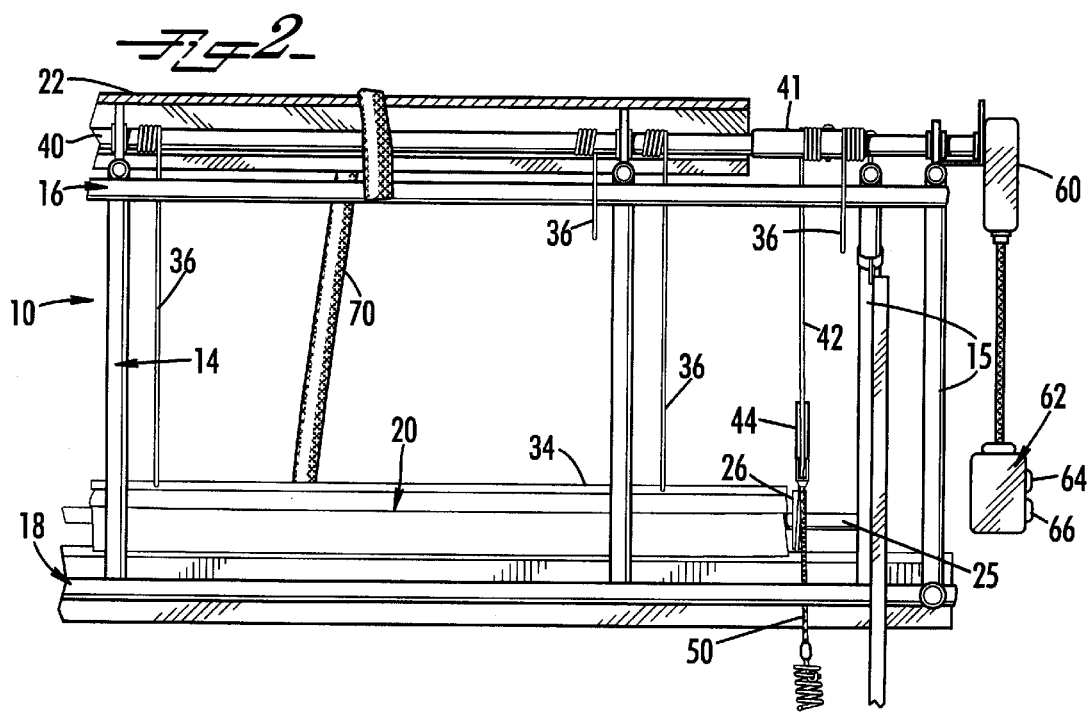
FIG. 2 is a side view of the upper half of a greenhouse with a covering mechanism made according to the present invention.

The present invention is a covering mechanism for use with an existing greenhouse as well as a greenhouse having a covering mechanism. Although described in terms of its use with a greenhouse, it will be clear that the covering mechanism can be used with other temporary or semi-permanent enclosures with little or no modification.

A greenhouse has a framework including sides and a "roof." The framework roof is essentially a series of trusses that, in the present invention, support a flexible, light-transmitting covering. The roof is typically arched or peaked with the top of the arch or the peak in the center. This top-most point of the framework will be referred to herein as the "top center." The lowest point on the roof, which is where the sides of the framework meet the roof trusses is at the sides of the greenhouse and will be referred to as the "sides" of the framework. Some greenhouses, or "cold frames," are arched from side to side. It will be clear that the present invention includes this type as well and that the covering runs over the entire arch of such a greenhouse.

A greenhouse according to a preferred embodiment of the present invention is illustrated in FIGS. 1–4. It comprises a framework, generally indicated by the reference number 10 which includes vertical supports 12 and roof trusses 14 connected to a top support member 16 at the top center of the greenhouse and to gutters 18 at the sides. The term "trusses" includes the arches or bows 15 and cross beams 17 as well as bracing 19. A covering panel 20 covers bows 15. There is a covering panel 20 for each side of bows 15 that moves up simultaneously from the sides to the top center in a manner that will be explained in more detail below, but which does so in essentially a symmetrical fashion. At the top center of the greenhouse is a central panel 22 to cover the gap between the two covering panels 20.

Covering panel 20 can be a synthetic or man-made fabric or plastic; in the present invention, however, it is preferably 6 mil polyethylene which has good tear strength and reasonably good resistance to weathering and ultraviolet light. However, any flexible fabric will suffice as long as it is reasonably strong and translucent. In applications other than greenhouses, the fabric can be chosen according to the requirements of that application. For example, canvas may be suitable for enclosures for outdoor events.

At each end of tension shaft 25 is a tension drum 26. Tension drums 26 are coaxial with tension shaft 25 and attached so that they rotate together. Covering panel 20 is wound onto tension shaft 25 in a particular way, as best seen in FIG. 4. Rather than begin winding covering panel 20 from one edge, two sheets of material of approximately the same size are attached to tension shaft 25 and wound thereon between tension drums 26 so that a first and a second, opposing edge 28, 30, of covering panel 20 are leading edges. As noted above, a leading edge is the first edge to be freed from tension shaft 25 as it is unrolled. Thus, first and second edges 28, 30, are the first to be unrolled from tension shaft 25.

Tension shafts 25 are supported on bows 15. Bows 15 are generally equally spaced alone greenhouse 10, but with two extra bows 15, one near each end, as shown. First edge 28 of covering panel 20 is attached to a first clip 32 that is firmly attached to gutter 18; edge 30 is attached to a second clip 34. Second clip 34 is connected by a first set of cables 36 to central shaft 40. It will be readily apparent that, as central shaft 40 is rotated, counter-clockwise in the present example, cables 36 wrap around central shaft 40 and pull second clip 34, and with it second edge 30 and flexible covering panel 20 alone bows 15 toward top center. As they do, tension shaft 25 rolls up bows 15 and eventually reaches a position approximately halfway along bows 15 between gutters 18 and top support member 16. If the two sheets of covering panel 20 are not approximately the same size, then tension shaft 25 will not be centered between gutters 18 and top support member 16. Importantly, depending on which sheet is larger, tension shaft 25 will be closer to gutter 18 or to top support member 16 when rolled up and may not roll down all the way. Thus, for complete covering and complete uncovering, the two sheets of covering panel 20 must be very close to the same size.

Also attached to each end of central shaft 40 are driving shafts 41. Driving shafts 41 and central shaft 40 are coaxial and attached so that rotating driving shaft 41 rotates central shaft 40. A second set of cables 42 is connected to second clip 34 at the ends of covering panel 20 and run to driving shaft 41 where they are wound and unwound depending on the direction of rotation of driving shaft 41. Second set of cables 42 operates through pulleys 44 to apply tension to tension drums 26 from driving shaft 41 when tension drums 26 are unwinding. As central shaft 40 winds up first set of cables 36 and driving shafts 41 unwind second set of cables 42. Cables 42 pass around pulleys 44 and on to tension drums 26 where they are wound up as tension drum 26 moves toward top support member 16. Pulleys 44 are attached to a spring 50 that keeps the tension on second set of cables 42 and thus on tension drum 26. Spring 50 is attached to an anchor 52 comprising a floor-engaging base 54 and a support 56 that is secured to bow 15 (FIGS. 1 and 3A). Anchor 52 firmly plants one end of spring 50 and helps it to apply tension to second set of cables 42 through pulley 44. That applied tension operates to keep covering panel 20 taut between tension drum 26 and first clip 32, and, by applying a reverse torque on tension drum 26, to keep covering panel 20 taut between tension drum and second clip 34. The stronger the force exerted by spring 50, the greater the tension applied to covering panels 20. The amount of tension exerted by spring 50 depends on the strength of covering panel material 20, but a modest amount of experimentation should yield a suitably strong spring that will provide the desired tension, but not so much that it strains the covering material. A typical garage door spring is usually strong enough for most greenhouse applications. It will be clear that a spring is not the only way of keeping tension on cables 42. Elastic cords or bands, counter weights, and other types of spring systems can be used.

To uncover the greenhouse, driving shaft 41, and thus central shaft 40, is rotated in a direction opposite that for covering the greenhouse, which is clockwise in the present example. First set of cables 36 is unwound from rotating central shaft 40; second set of cables 42 is wound up by rotating driving shaft 41. Second set of cables 42, operating through pulley 44, rotates tension drum 26 as it unwinds, aided by tension supplied by spring 50.

Rotating driving shaft 41 can be done manually, such as by using a hand crank, or by a motor 60 mounted on the end of driving shaft 41 and accessible by the user standing on the ground via a control box 62. Control box needs to include, for example, a three position, up-down-neutral switch 64 and a power on/off switch 66. Optionally, control box 62 may have a more elaborate control system that is more automatic and reflects the temperature inside and outside the greenhouse, opening the covering panel 20 when and to the extent that it is programmed to do so. The left and right sides of a greenhouse equipped with the present invention are symmetric except that the cables of first set of cables 36 from the left and right sides are both wound counterclockwise and the cables of the second set of cables 42 are both wound clockwise, as shown, so that the counterclockwise rotation of driving shaft 41 covers bows 15 and the clockwise rotation of driving shaft uncovers bows 15.

It will be clear that the ratio of the diameters of central shaft 40 to tension shaft 25 and tension drum 26 and driving shaft 41 need to be in an appropriate relationship so that covering panel 20 covers and uncovers bows 15 smoothly. Nominally, the ratio of the diameters of driving shaft 41 to tension drum 26 is preferably approximately 0.3–0.4; and the ratio of the diameters of central shaft 40 to tension shaft 25 is about 0.9–1.0. Driving shaft 41 may be the same diameter as central shaft 40 and may in fact be all one shaft if convenient.

Ideally, covering panel 20 runs the length of the greenhouse. However, in the alternative, standard lengths of covering panels, each with separate motors either individually controlled or commonly controlled can be provided for long greenhouses or those with different types of plants housed therein to provide selective exposure at the convenience of the user.

Optionally, but preferably, hold down straps 70 can be attached across the top of covering panels 20 from one gutter 18 to the other gutter 18 where they are fastened tight enough so that covering panels 20 are not easily lifted by high winds, but are not so tight that they interfere with movement of covering panels 20.

It will be clear to those skilled in the art of greenhouse design that many modifications and substitutions can be made to the foregoing preferred embodiments without departing from the spirit and scope of the invention.

What is claimed is:

1. A device for covering a greenhouse frame, said frame including at least two trusses, said mechanism comprising:

a driving shaft adapted to be rotatably attached to the top of a greenhouse;

a tensioning shaft adapted to move on top of said trusses of said greenhouse; a covering fastened to said greenhouse and to said tensioning shaft, said covering having a leading edge, said covering being wound onto said tensioning shaft when said greenhouse is uncovered and unwound from said tensioning shaft when said greenhouse is covered;

means connected to said tensioning shaft and said driving shaft for moving said leading edge toward and away from said driving shaft to cover and uncover, respectively, said greenhouse;

and means connected to said tensioning shaft for tensioning said covering when said moving means is covering and uncovering said greenhouse.

2. The device as recited in claim 1, wherein said moving means causes said tensioning shaft to rotate, thereby unwinding said covering, when said moving means is covering said greenhouse.

3. The device as recited in claim 1, wherein said moving means causes said drive shaft to rotate, thereby unwinding said covering, when said moving means is covering said greenhouse, and wherein said device further comprises a spring for urging said drive shaft to rotate counter to the direction said drive shaft rotates when said moving means is covering said greenhouse.

4. The device as recited in claim 1, wherein said covering has a fixed edge opposing said leading edge and a middle between said fixed edge and said leading edge, said middle being fastened to said tensioning shaft.

5. The device as recited in claim 1, wherein said moving means further comprises a motor for rotating said driving shaft.

6. The device as recited in claim 1, further comprising at least one tie down strap extending over said covering for holding said covering down onto said trusses.

7. The device as recited in claim 1, wherein said covering panel has two leading edges that are wound and unwound from said tensioning shaft.

8. A greenhouse, comprising:

a frame including at least two trusses;

a driving shaft rotatably carried by said trusses at the top of said trusses;

a tensioning shaft adapted to move on top of said trusses of said greenhouse;

a covering fastened to said greenhouse and to said tensioning shaft, said covering having a leading edge, said covering being wound onto said tensioning shaft when said greenhouse is uncovered and unwound from said tensioning shaft when said greenhouse is covered;

means connected to said tensioning shaft and said driving shaft for moving said leading edge toward and away from said driving shaft to cover and uncover, respectively, said greenhouse;

and means connected to said tensioning shaft for tensioning said covering when said covering is covering and uncovering said greenhouse.

9. The greenhouse as recited in claim 8, wherein said moving means causes said tensioning shaft to rotate, thereby unwinding said covering from said tensioning shaft, when said moving means is covering said greenhouse.

10. The greenhouse as recited in claim 8, wherein said moving means causes said drive shaft to rotate, thereby unwinding said covering, when said moving means is covering said greenhouse, and wherein said device further comprises a spring for urging said drive shaft to rotate counter to the direction said drive shaft rotates when said moving means is covering said greenhouse.

11. The greenhouse as recited in claim 8, wherein said moving means further comprises:

a first set of cables connecting said leading edge of said covering to said driving shaft, said driving shaft winding said first set of cables on to it when said said greenhouse is being covered;

a second set of cables connecting said driving shaft to said tensioning shaft, said driving shaft unwinding said second set of cables from it when said greenhouse is being covered;

means for applying tension to said second set of cables; and a motor for rotating said driving shaft.

12. The greenhouse as recited in claim 11, wherein said applying means further comprises a spring connected to said second set of cables.

13. The greenhouse as recited in claim 11, wherein said applying means further comprises an anchor and means secured to said anchor for pulling said second set of cables taut.

14. The greenhouse as recited in claim 8, wherein said covering has a fixed edge opposing said leading edge and a middle between said fixed edge and said leading edge, said middle being fastened to said tensioning shaft, said fixed edge being attached to said greenhouse.

15. The greenhouse as recited in claim 8, wherein said moving means further comprises a motor for rotating said driving shaft.

16. The greenhouse as recited in claim 8, further comprising at least one tie down strap extending over said covering for holding said covering down onto said trusses.

17. A greenhouse, comprising:

a frame including at least two trusses;

a driving shaft rotatably carried by said trusses at the top of said trusses;

a tensioning shaft adapted to move on said trusses of said greenhouse;

a covering fastened to said greenhouse and to said tensioning shaft, said covering having a leading edge, said covering being wound onto said tensioning shaft when said greenhouse is uncovered and unwound from said tensioning shaft when said greenhouse is covered;

a first set of cables connecting said leading edge of said covering to said driving shaft, said driving shaft winding said first set of cables on to it when said greenhouse is being covered;

a second set of cables connecting said driving shaft to said tensioning shaft, said driving shaft unwinding said second set of cables from it when said greenhouse is being covered;

means for applying tension to said second set of cables; and a motor for rotating said driving shaft.

18. The greenhouse as recited in claim 17, further comprising at least one tie down strap extending over said covering for holding said covering down onto said trusses.

19. The greenhouse as recited in claim 17, wherein said applying means further comprises:

a spring connected to said second set of cables;

an achor attached to said spring to hold one end of said spring in place.

20. The greenhouse as recited in claim 17, wherein, as said first set of cables winds onto said central shaft, said second set of cables unwinds from said driving shaft and onto said tension drum.

* * * * *